United States Patent
Burke

(10) Patent No.: US 8,805,402 B2
(45) Date of Patent: Aug. 12, 2014

(54) LOW POWER GEOGRAPHIC STATIONARITY DETECTION

(75) Inventor: John Michael Burke, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/414,251

(22) Filed: Mar. 7, 2012

(65) Prior Publication Data

US 2013/0237241 A1    Sep. 12, 2013

(51) Int. Cl.
*H04W 24/00*    (2009.01)

(52) U.S. Cl.
USPC ............... 455/456.1; 455/436; 455/414.1

(58) Field of Classification Search
USPC ............... 455/456.1, 431.1, 436, 414.1
See application file for complete search history.

(56) References Cited

U.S. PATENT DOCUMENTS

| | | | |
|---|---|---|---|
| 6,373,882 B1 | 4/2002 | Atarius et al. | |
| 7,042,391 B2 | 5/2006 | Meunier et al. | |
| 7,136,680 B2 | 11/2006 | Leizerovich et al. | |
| 7,216,053 B2 | 5/2007 | Rakkola et al. | |
| 7,881,902 B1 * | 2/2011 | Kahn et al. | 702/160 |
| 8,131,465 B2 | 3/2012 | Eitan et al. | |
| 2004/0162109 A1 | 8/2004 | Shimoda et al. | |
| 2008/0140338 A1 | 6/2008 | No et al. | |
| 2009/0189813 A1 * | 7/2009 | Haas et al. | 342/384 |
| 2009/0319221 A1 * | 12/2009 | Kahn et al. | 702/141 |
| 2010/0056872 A1 | 3/2010 | Kahn et al. | |
| 2010/0184420 A1 | 7/2010 | Reinhold et al. | |
| 2010/0214216 A1 | 8/2010 | Nasiri et al. | |
| 2010/0302055 A1 | 12/2010 | Yaguchi | |
| 2010/0304754 A1 | 12/2010 | Czompo et al. | |
| 2011/0294520 A1 * | 12/2011 | Zhou et al. | 455/456.1 |
| 2012/0129460 A1 * | 5/2012 | Hodis et al. | 455/67.11 |

FOREIGN PATENT DOCUMENTS

EP    2275830 A1    1/2011

OTHER PUBLICATIONS

U.S. Appl. No. 13/034,503, filed Feb. 24, 2011, "Low Average Velocity Pedestrial Motion Identification".
Anderson, I., et al., "Context Awareness via GSM Signal Strength Fluctuation", 4th International Conference on Pervasive Computing, Late Breaking Results, May 2006, pp. 27-31, XP055063219
International Search Report and Written Opinion—PCT/US2013/026703—ISA/EPO—May 28, 2013.

\* cited by examiner

*Primary Examiner* — Jinsong Hu
*Assistant Examiner* — Jean Chang
(74) *Attorney, Agent, or Firm* — Muncy, Geissler, Olds & Lowe, P.C.

(57) ABSTRACT

Identifying geographic stationarity of a mobile device may be achieved by determining whether the mobile device is engaged in high average velocity movement based on radio frequency (RF) environment variation estimation, determining whether the mobile device is engaged in low average velocity movement based on pedestrian stepping information, and declaring a stationary state for the mobile device based on an absence of high and low average velocity movement.

44 Claims, 8 Drawing Sheets

LOW POWER GEOGRAPHIC STATIONARITY DETECTION

FIELD OF DISCLOSURE

The present disclosure relates generally to motion state identification, and more specifically, to identifying geographic stationarity of a mobile device.

BACKGROUND

Microelectromechanical system (MEMS) sensors have recently been integrated within mobile devices to provide acceleration measurements for identifying motion. Absolute stationarity of the mobile device (e.g., sitting unattended on a nightstand or desk), for example, may be inferred from tri-axial MEMS accelerometer signals when the acceleration change measured on all axes is insignificant. Recent advancements have also enabled the identification of other stationarity situations. A "fidgeting" motion (e.g., when the device is attached to a person's belt while sitting in a meeting or being held in a person's hand while standing conversing with a colleague), for example, may be distinguished from other types of pedestrian motion such as continuous walking or running.

However, conventional stationarity detection schemes (at least those operating efficiently with low power consumption) have been heretofore limited to only relative stationarity identification with respect to a given inertial frame of reference. They have not been able to efficiently identify stationarity of a mobile device with respect to a given geographic location on Earth. For a wide number of context-aware applications, there is a need in the art to be able to efficiently identify geographic stationarity of a mobile device.

SUMMARY

Embodiments of the invention are directed to systems and methods for identifying geographic stationarity of a mobile device.

In some embodiments, a method is provided for identifying geographic stationarity of a mobile device. The method may comprise, for example: determining whether the mobile device is engaged in high average velocity movement based on radio frequency (RF) environment variation estimation; determining whether the mobile device is engaged in low average velocity movement based on pedestrial stepping information; and declaring a stationary state for the mobile device based on an absence of high and low average velocity movement.

In other embodiments, an apparatus is provided for identifying geographic stationarity of a mobile device. The apparatus may comprise, for example, at least one processor configured to: determine whether the mobile device is engaged in high average velocity movement based on RF environment variation estimation, determine whether the mobile device is engaged in low average velocity movement based on pedestrial stepping information, and declare a stationary state for the mobile device based on an absence of high and low average velocity movement. The apparatus may also comprise memory coupled to the at least one processor and configured to store related data and/or instructions.

In still other embodiments, another apparatus is provided for identifying geographic stationarity of a mobile device. The apparatus may comprise, for example: means for determining whether the mobile device is engaged in high average velocity movement based on RF environment variation estimation; means for determining whether the mobile device is engaged in low average velocity movement based on pedestrial stepping information; and means for declaring a stationary state for the mobile device based on an absence of high and low average velocity movement.

In still other embodiments, a computer-readable medium is provided that comprises code, which, when executed by a processor, causes the processor to perform operations for identifying geographic stationarity of a mobile device. The computer-readable medium may comprise, for example: code for determining whether the mobile device is engaged in high average velocity movement based on RF environment variation estimation; code for determining whether the mobile device is engaged in low average velocity movement based on pedestrial stepping information; and code for declaring a stationary state for the mobile device based on an absence of high and low average velocity movement.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
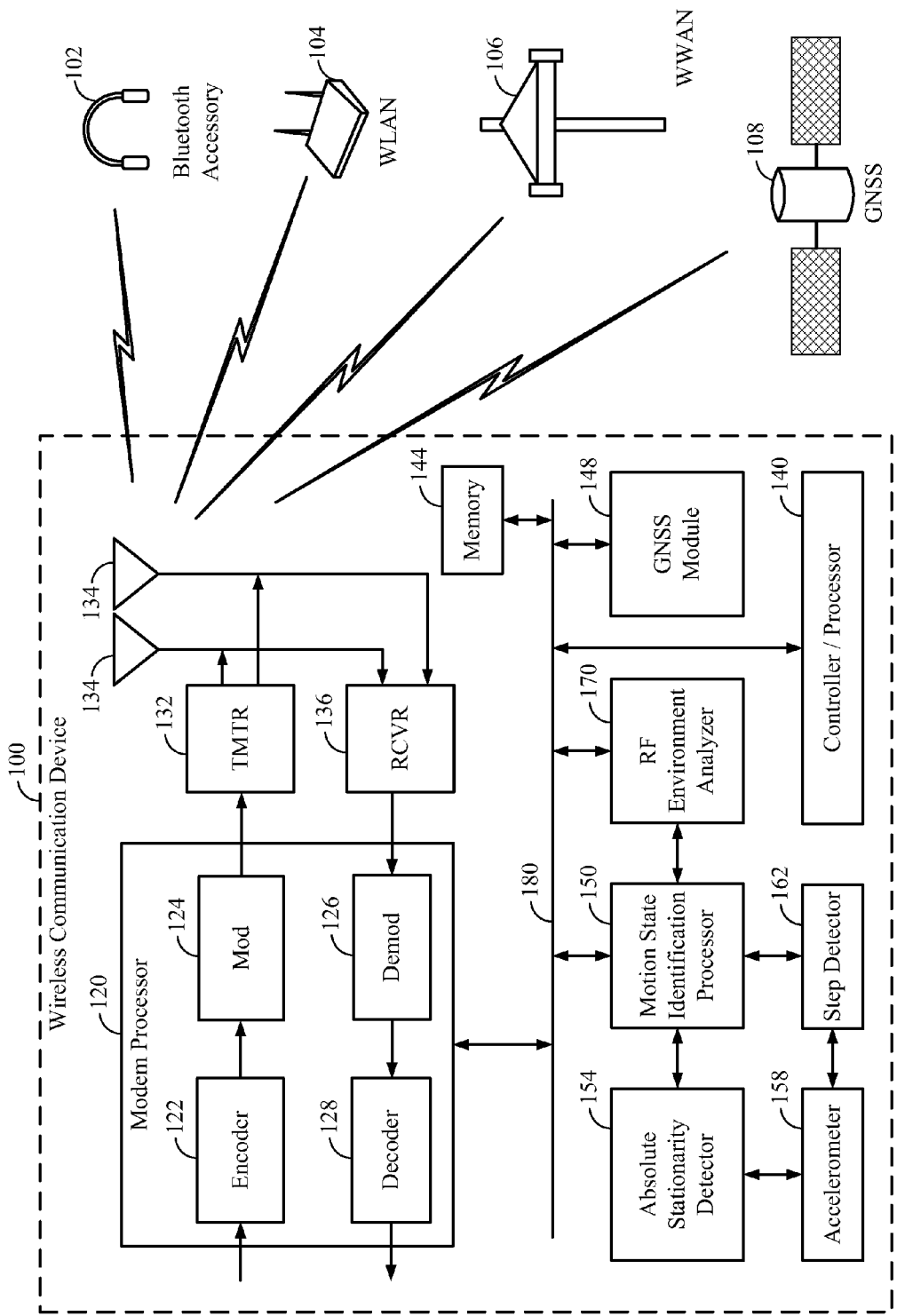
FIG. 1 illustrates an example wireless communication device configured for geographic stationarity identification according to one or more embodiments.

Aspects of the invention are disclosed in the following description and related drawings directed to specific embodiments of the invention. The term "embodiments of the invention" does not require that all embodiments of the invention include the discussed feature, advantage, or mode of operation, and alternate embodiments may be devised without departing from the scope of the invention. Additionally, well-known elements of the invention may not be described in detail or may be omitted so as not to obscure the relevant details of the invention.

The terminology used herein is for the purpose of describing particular embodiments only and is not intended to be limiting of all embodiments of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

In addition, as used herein, the term "movement" is distinguished from the term "motion" for a more precise description. In particular, the term "movement" is used to refer to a change in geographic location with respect to a coordinate system that is fixed relative to the Earth (e.g., latitude and longitude). Movement, in this sense, includes both low average velocity movement (e.g., continuous walking or running) and high average velocity movement (e.g., automotive, aircraft, watercraft, or bicycle travel). By contrast, the term "motion" is used to refer to any change in location, position, or orientation. Motion, in this sense, may include not only low and high average velocity movement, but also "fidgeting" scenarios where a mobile device is not "absolutely stationary" (e.g., sitting unattended on a nightstand or desk), but at the same time does not substantially change in geographic location. For example, a device attached to a person's belt while that person sits in a meeting or a device held in a person's hand while that person stands conversing with a colleague is often jostled about as the person fidgets, changing its position and orientation. However, the geographic location of such a device remains substantially constant.

As discussed in the Background above, it may be useful for a wide variety of context-aware applications and others to be able to distinguish between a device in motion that is moving and one that is not moving. However, conventional low power stationarity detection schemes have been heretofore unable to efficiently identify stationarity of a mobile device in terms of a lack of movement with respect to a given geographic location. Accordingly, methods, apparatuses, systems, and other techniques are provided herein to efficiently identify geographic stationarity of a mobile device.

FIG. 1 illustrates an example wireless communication device configured for geographic stationarity identification according to one or more embodiments. In general, the wireless mobile communication device 100 (or simply, "mobile device") may be capable of communicating with various accessory devices 102 (e.g., Bluetooth devices), Wireless Local Area Networks (WLANs) 104 (e.g., IEEE 802.11 Wi-Fi), Wireless Wide Area Networks (WWANs) 106 (e.g., cellular communication systems), Global Navigation Satellite Systems (GNSSs) 108 (e.g., GPS), etc., using built-in or external hardware.

On the transmit path, traffic data to be sent by the mobile device 100 may be processed (e.g., formatted, encoded, and interleaved) by an encoder 122 and further processed (e.g., modulated, channelized, and scrambled) by a modulator (Mod) 124 in accordance with an applicable radio technology to generate an output signal. A transmitter (TMTR) 132 may then condition (e.g., convert to analog, filter, amplify, and upconvert) the output signal and generate a modulated signal, which is transmitted via one or more antennas 134. On the receive path, antennas 134 may receive signals transmitted from the illustrated wireless systems or other devices. A receiver (RCVR) 136 may then condition (e.g., filter, amplify, downconvert, and digitize) a received signal from the one or more antennas 134 and provide samples. A demodulator (Demod) 126 may process (e.g., descramble, channelize, and demodulate) the samples and provide symbol estimates. A decoder 128 may further process (e.g., deinterleave and decode) the symbol estimates and provide decoded data.

The encoder 122, modulator 124, demodulator 126, and decoder 128 may form a modem processor 120, as shown. The mobile device 100 may also include one or more general purpose controllers or processors (illustrated in the singular as the controller/processor 140), memory 144 configured to store related data or instructions, and/or one or more specific purpose controllers or processors (illustrated by the exemplary GNNS module 148 for processing GNSS information). Together, via a bus 180, these units may perform processing in accordance with the appropriate radio technology or technologies used for communication, as well as other functions for the mobile device 100.

According to one or more embodiments, the mobile device 100 may further include a motion state identification processor 150, which may or may not be part of the controller/processor 140, as well as various other motion state related hardware, such as the illustrated absolute stationarity detector 154 (sometimes referred to as an "any motion" detector), accelerometer 158, step detector 162, and RF environment analyzer 170.

In the illustrated configuration, the motion state identification processor 150 may receive basic motion information from the absolute stationarity detector 154 and pedestrian step information from the step detector 162, which each operate in conjunction with acceleration signals provided by the accelerometer 158. The accelerometer 158 is typically a triaxial accelerometer that provides acceleration data from three orthogonal axes. Other examples may include multiple (e.g., three) single axis accelerometers, or any other device from which accurate orthogonal triaxial acceleration measurements may be derived. It will be appreciated that the absolute stationarity detector 154 and step detector 162 may share the accelerometer 158 as shown, or may each have their own accelerometer, either internal or external to the respective detector.

The absolute stationarity detector 154 detects whether the mobile device 100 is absolutely stationary (i.e., whether a threshold level of motion has or has not been detected). For example, the absolute stationarity detector 154 may monitor acceleration signals from the accelerometer 158 and determine an associated acceleration spread. Acceleration spread is the difference between the maximum and the minimum scalar acceleration values in a given observation window, where acceleration spread is deemed positive if the observation window minimum occurs before the maximum, and negative otherwise. If the maximum absolute value of acceleration spread is less than a specified threshold (e.g., a noise floor), the absolute stationarity detector 154 determines that the mobile device is absolutely stationary. The noise floor threshold is typically on the order of a few hundredths of the acceleration due to gravity.

The step detector 162 detects pedestrian steps associated with a user of the mobile device 100. Step detection may be achieved in a variety of ways, but typically includes calculating scalar acceleration from triaxial accelerometer data, window averaging the scalar acceleration data, and calculating the acceleration spread. The acceleration spread may be amplitude filtered and time filtered to identify pedestrian steps. For example, a pedestrian step may be identified from the acceleration spread pattern when a minimum acceleration spread amplitude is maintained over a minimum step duration associated with pedestrial stepping. The minimum acceleration spread amplitude may be on the order of a few tenths of the acceleration due to gravity, and the minimum step duration may be on the order of a several hundredths of a second, for example. When a pedestrial step is detected, the step detector 162 outputs pedestrial stepping information, such as a time stamp associated with the detected step, and provides this information to the motion state identification processor 150.

The RF environment analyzer 170 monitors RF environment variation for the mobile device 100. This may be performed as part of a prescribed WWAN processing routine where changes in a mobile station's environment are continually monitored to optimize one or more signal processing functions. For example, in some embodiments, the RF environment analyzer 170 may perform RAKE receiver processing, in which multipath time delays in a given channel are exploited by combining delayed replicas of a transmitted signal in order to improve link quality. In general, a RAKE receiver captures most of the received signal energy by selecting the strongest components of a received multipath signal. The strongest components may be selected by multipath delay searching. Analysis of received RF signal features using RAKE receiver fingers is useful for conventional duty cycle optimization of the searching function, and, according to one or more embodiments herein, may also be useful for motion state identification purposes. Accordingly, the RF environment analyzer 170 also provides this or other similar RF environment variation estimation to the motion state identification processor 150.

Based on some or all of the information provided to it, the motion state identification processor 150 may reliably and efficiently determine whether the mobile device 100 is engaged in high or low average velocity movement. In this way, the motion state identification processor 150 may attempt to systematically exclude each cognizable type of movement, and therefore more definitively declare a stationary state for the mobile device 100 in which its geographic location remains substantially constant.

Figure 2:
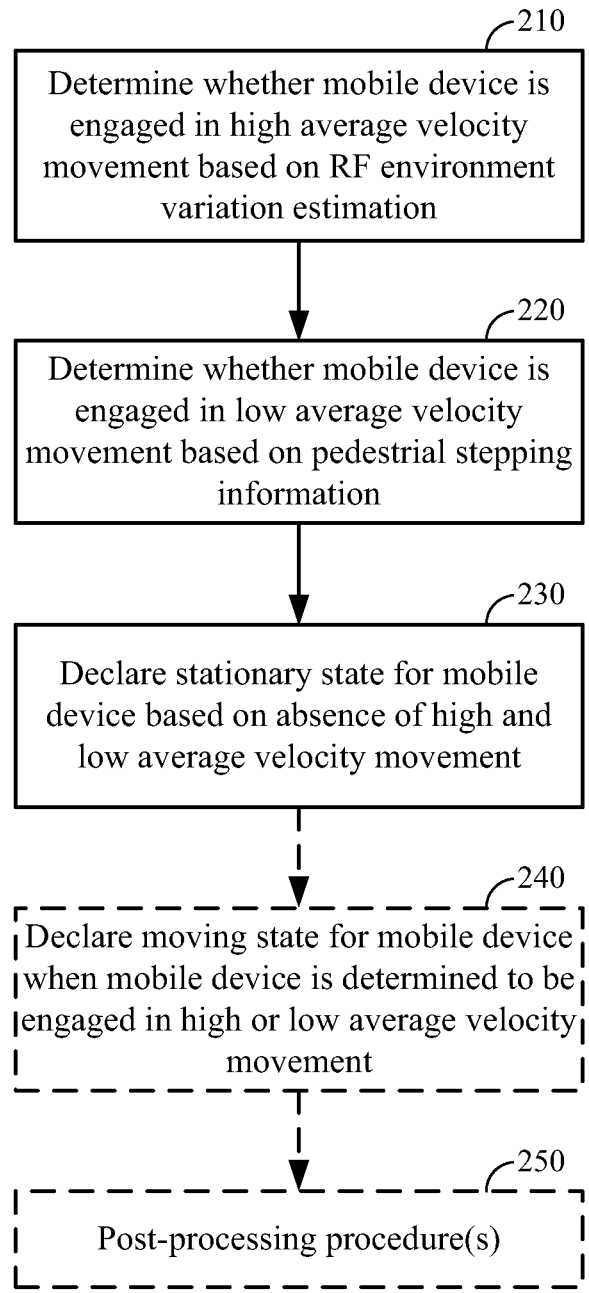
FIG. 2 illustrates an example method for a motion state identification processor to identify geographic stationarity of a mobile device based on RF environment variation estimation and pedestrian stepping information.

FIG. 2 illustrates an example method for the motion state identification processor 150 to identify geographic stationarity of the mobile device 100 based on RF environment variation estimation and pedestrial stepping information. As shown, the motion state identification processor 150 may determine whether the mobile device 100 is engaged in high average velocity movement (e.g., automotive, aircraft, watercraft, or bicycle travel) based on RF environment variation estimation provided by the RF environment analyzer 170 (block 210), and may determine whether the mobile device 100 is engaged in low average velocity movement (e.g., continuous walking or running by a user of the mobile device 100) based on pedestrial stepping information provided by the step detector 162 (block 220). Based on an absence of both high and low average velocity movement, the motion state identification processor 150 may declare a stationary state for the mobile device 100 (block 230). As discussed above, the stationary state may correspond to absolute stationarity of the mobile device 100 or may correspond to fidgeting by a user of the mobile device 100 at a particular geographic location that remains substantially constant. When desired, the motion state identification processor 150 may otherwise declare a moving state for the mobile device 100 when the mobile device 100 is determined to be engaged in high or low average velocity movement (optional block 240).

As discussed above, efficient geographic stationarity identification as described herein may be useful for a wide variety of applications, such as cellular telephony and context-aware computing. Accordingly, in some embodiments, the motion state identification processor 150, acting on its own or through the controller/processor 140, may initiate one or more post-processing procedures based on whether the mobile device 100 is in a stationary state or a moving state (optional block 250). In some embodiments, the post-processing procedures involve selectively enabling or disabling one or more routine operations of the mobile device 100. For example, the motion state identification processor 150 may disable at least one geographical location update of the mobile device 100 in response to declaring the stationary state. This may be advantageous in that it allows the mobile device 100 to conserve power by refraining from performing unnecessary high power location updates (e.g., GPS fixes) when the mobile device 100 is known to be stationary at a substantially constant geographic location.

In some embodiments, the motion state identification processor 150 may additionally monitor the absolute stationarity of the mobile device 100 using the absolute stationarity detector 154. In this way, the motion state identification processor 150 may further conserve power by refraining from initiating the determination of whether the mobile device 100 is engaged in high average velocity movement until the absolute stationarity detector 154 indicates that at least some motion has occurred. Similarly, the motion state identification processor 150 may further conserve power by refraining from initiating the determination of whether the mobile device is engaged in low average velocity movement until the mobile device 100 is determined to not be engaged in high average velocity movement.

Figure 3:
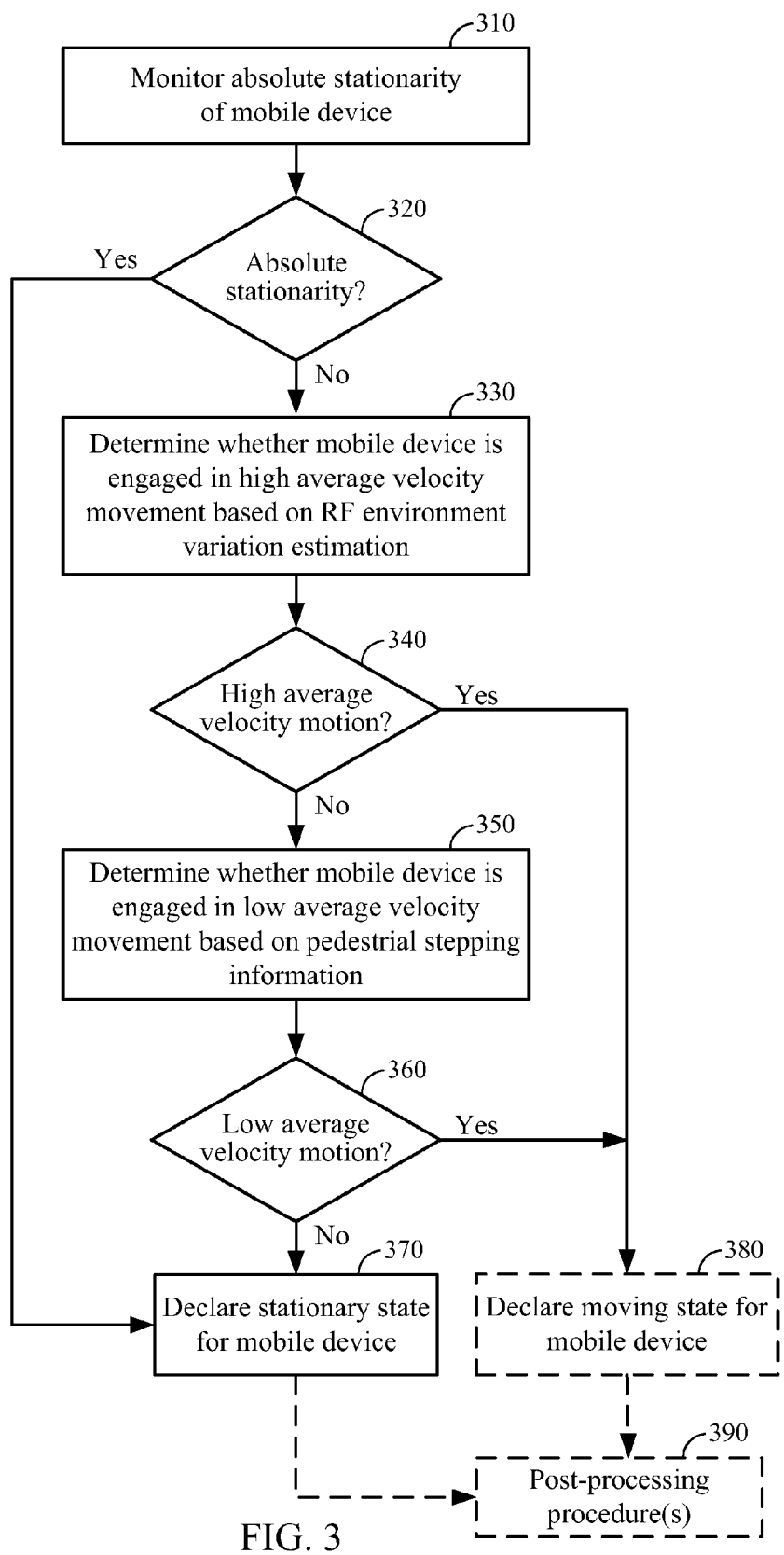
FIG. 3 illustrates an example method for a motion state identification processor to identify geographic stationarity of a mobile device when additionally using an absolute stationarity detector.

FIG. 3 illustrates an example method for the motion state identification processor 150 to identify geographic stationarity of the mobile device 100 when additionally using the absolute stationarity detector 154. As shown, the motion state identification processor 150 initially monitors the absolute stationarity of the mobile device 100 using the absolute stationarity detector 154 (block 310). If absolute stationarity is detected at this early stage ('yes' at decision 320), the motion state identification processor 150 may forgo looking for high or low average velocity movement, and simply declare a stationary state for the mobile device 100 (block 370).

Otherwise, if at least some motion is detected ('no' at decision 320), the motion state identification processor 150 may initiate the determination of whether the mobile device 100 is engaged in high average velocity movement based on RF environment variation estimation provided by the RF environment analyzer 170 (block 330). If the mobile device 100 is determined to be engaged in high average velocity movement ('yes' at decision 340), the motion state identification processor 150 may forgo looking for low average velocity movement, and, when desired, simply declare a moving state for the mobile device 100 (optional block 380).

Otherwise, if the mobile device 100 is determined to not be engaged in high average velocity movement ('no' at decision 340), the motion state identification processor 150 may initiate the determination of whether the mobile device 100 is engaged in low average velocity movement based on pedestrial stepping information provided by the step detector 162 (block 350). If the mobile device 100 is determined to not be engaged in low average velocity movement ('no' at decision 360), the motion state identification processor 150 may declare a stationary state for the mobile device 100 (block 370). Otherwise, if the mobile device 100 is determined to be engaged in low average velocity movement ('yes' at decision 360), the motion state identification processor 150 may refrain from declaring a stationary state for the mobile device 100, and instead, when desired, declare a moving state for the mobile device 100 (optional block 380).

Based on whether the mobile device 100 is in a stationary state or a moving state, the motion state identification processor 150, acting on its own or through the controller/processor 140, may initiate one or more post-processing procedures, as discussed in more detail above (optional block 390).

Returning to FIG. 2, the determining of whether the mobile device 100 is engaged in high average velocity movement based on RF environment variation estimation provided by the RF environment analyzer 170 (block 210) may be performed in a variety of ways. For example, in some embodiments, properties of the RF signaling such as maximum Doppler frequency may be exploited to determine the mobile device's 100 velocity.

Figure 4:
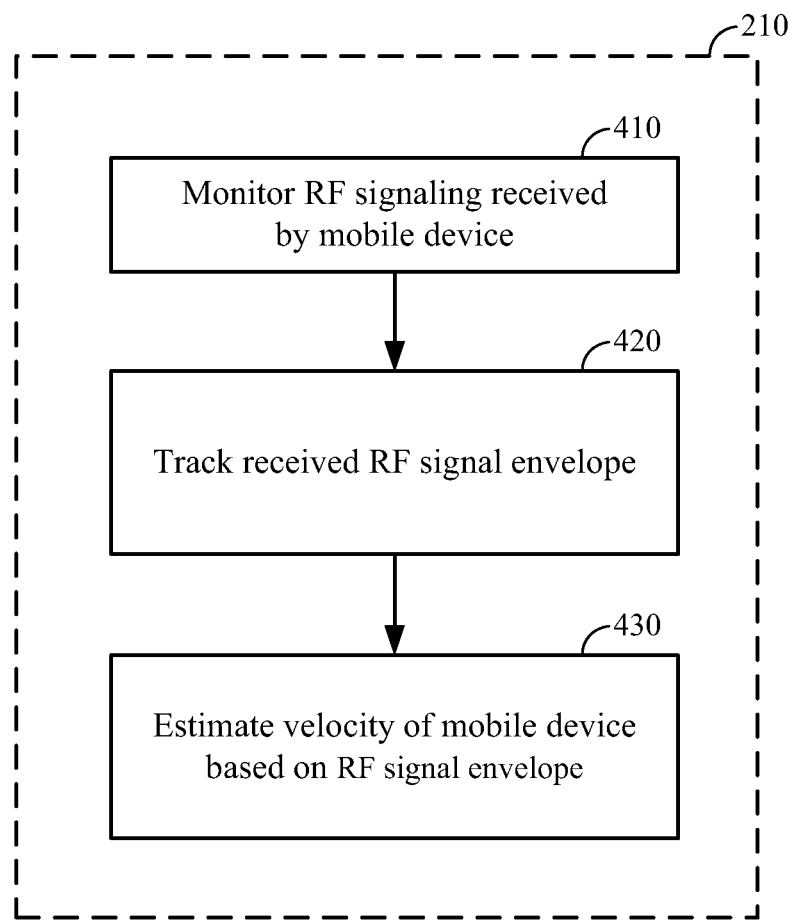
FIG. 4 illustrates an example method of determining whether a mobile device is engaged in high average velocity movement based on RF environment variation estimation.

FIG. 4 illustrates an example method of determining whether the mobile device 100 is engaged in high average velocity movement based on RF environment variation estimation, as in block 210. In this example, the RF environment analyzer 170 routinely monitors RF signaling received by the mobile device 100 (block 410). The RF environment analyzer 170 then tracks the envelope (amplitude) of the received RF signal (block 420), and estimates a velocity of the mobile device 100 based on the envelope (block 430). For example, in some embodiments the RF environment analyzer 170 may estimate the velocity of the mobile device 100 based on squared deviations of a logarithmically compressed representation of the RF signal envelope. In other embodiments, the RF environment analyzer 170 may use the level crossing rate of the logarithmically compressed received RF signal envelope to estimate the velocity of the mobile device 100.

In still other embodiments, the RF environment analyzer 170 may use frequency offset information of different multipath components, supplied by the RAKE fingers of a RAKE receiver, for example, when communicating with a plurality of CDMA base stations to estimate the velocity of the mobile device 100. Frequency offsets of opposite sign with magnitudes greater than predetermined thresholds may indicate that the mobile device 100 is engaged in high average velocity movement.

In still other embodiments, the RF environment variation estimation may include more explicit indications of movement. For example, in some embodiments, the RF environment variation may be derived from WWAN signaling from one or more WWAN base stations, such as the WWAN base station 106 illustrated in FIG. 1, and the RF environment analyzer 170 may monitor the manner with which the mobile device 100 is handed off among these base stations. A continuous change of the base stations in the vicinity of the mobile device 100 may indicate high average velocity movement. Further, in still other embodiments, the RF environment variation may be derived from WLAN signaling from one or more WLAN access points, such as the WLAN access point 104 illustrated in FIG. 1, and the RF environment analyzer 170 may monitor or "sniff" the WLAN signaling to determine the particular WLAN access points in the vicinity of the mobile device 100. A continuous change in the WLAN access points in the vicinity of the mobile device 100 may indicate that the mobile device 100 is engaged in high average velocity movement.

It will be appreciated that, in some embodiments, normal WWAN signal processing routines may already require that the mobile device's 100 environment be routinely monitored in one or more of the manners above. Accordingly, in such embodiments, the motion state identification processor 150 may be able to take advantage of this underlying processing to conserve power for the mobile device 100.

In some situations, it is recognized that stationarity based on signaling from a WWAN base station may be unreliable because the WWAN base station itself may not be geographically stationary. For example, certain cruise ships may have their own onboard cellular systems for use by their passengers while at sea. In this case, although the mobile device 100 may appear to be stationary with respect to such a WWAN base station, both are in fact engaged in high average velocity movement. Accordingly, in some embodiments, the motion state identification processor 150 may perform additional procedures as a safeguard against WWAN base stations that are not geographically stationary.

Figure 5:
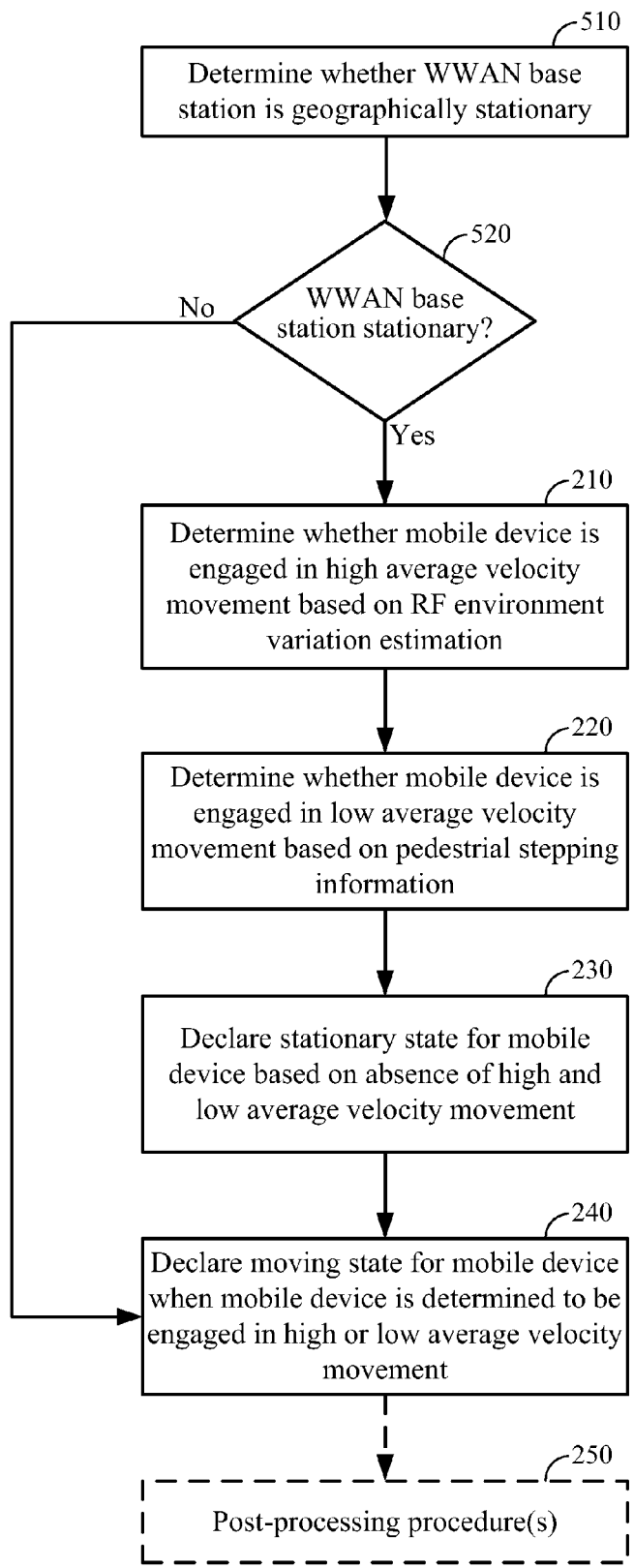
FIG. 5 illustrates an example enhancement of the method of FIG. 2 for a motion state identification processor to identify geographic stationarity of a mobile device while guarding against wide area network base stations that are not geographically stationary.

FIG. 5 illustrates an example enhancement of the method of FIG. 2 for the motion state identification processor 150 to identify geographic stationarity of the mobile device 100 while guarding against WWAN base stations that are not geographically stationary. In this example, the motion state identification processor 150 performs an initial check to determine whether the WWAN base station from which it receives RF signaling is geographically stationary (block 510). When the WWAN base station is not geographically stationary ('no' at decision 520), the motion state identification processor 150 simply proceeds to block 240 (described above) and prompts a declaration of a moving state for the mobile device 100 as a precaution against a false positive stationarity declaration. Otherwise, if the WWAN base station is in fact geographically stationary ('yes' at decision 520), the motion state identification processor 150 proceeds through the remaining aspects of the method of FIG. 2, including determining whether the mobile device 100 is engaged in high average velocity movement based on RF environment variation estimation provided by the RF environment analyzer 170 (block 210), determining whether the mobile device 100 is engaged in low average velocity movement based on pedestrian stepping information provided by the step detector 162 (block 220), and, based on an absence of both high and low average velocity movement, declaring a stationary state for the mobile device 100 (block 230).

Figure 6:
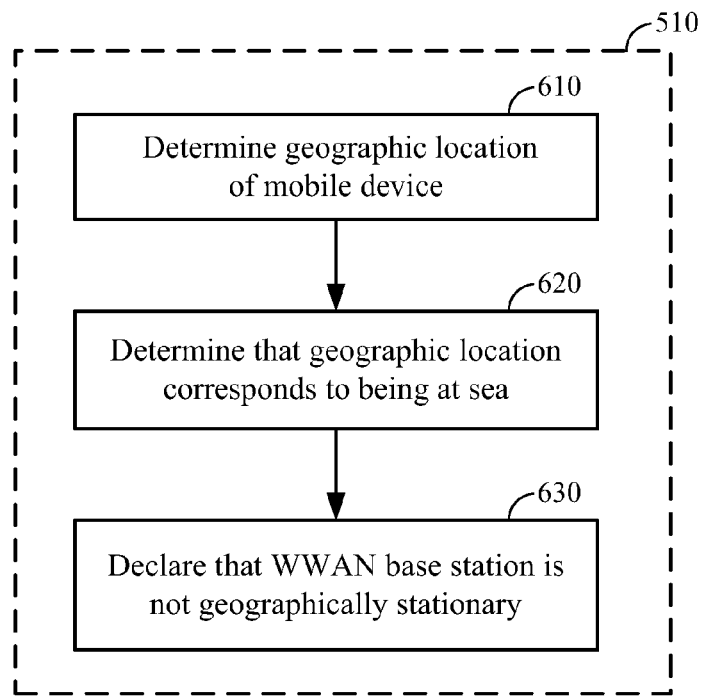
FIG. 6 illustrates an example method for determining whether a wide area network base station is geographically stationary.

FIG. 6 illustrates an example method for determining whether a WWAN base station is geographically stationary as in block 510. In this example, the motion state identification processor 150 determines a geographic location of the mobile device 100 (block 610), and determines that the geographic location corresponds to being at sea (block 620). This may be achieved, for example, by an initial GPS fix using the GNSS module 148, and comparing the determined coordinates against a geographical map. The motion state identification processor 150 accordingly declares that the WWAN base station is not geographically stationary (block 630).

Figure 7:
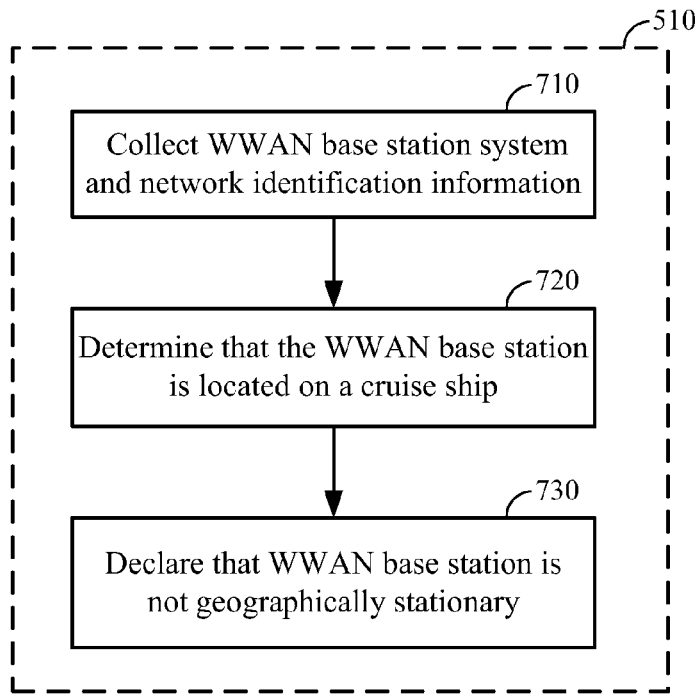
FIG. 7 illustrates another example method for determining whether a wide area network base station is geographically stationary.

FIG. 7 illustrates another example method for determining whether a WWAN base station is geographically stationary as in block 510. In this example, WWAN base station location on a cruise ship is inferred using the system and network identification information required to be communicated to CDMA mobile stations. Accordingly, the motion state identification processor 150 collects WWAN base station system and network identification information (block 710), determines that the WWAN base station is located on a cruise ship (block 720), and again declares that the WWAN base station is not geographically stationary (block 730).

It will be appreciated, however, that still other techniques for determining whether a given WWAN base station is at sea or otherwise not geographically stationary may be employed.

In other situations, it is also recognized that current RF environment variation estimation may not be available at all.

The motion state identification processor 150 may handle these situations in a variety of ways. For example, in some embodiments, the motion state identification processor 150 may simply declare a moving state for the mobile device when current RF environment variation information is not available, again as a precaution against a false positive stationarity declaration.

Returning to FIG. 2, the determining of whether the mobile device 100 is engaged in low average velocity movement (block 220) may also be performed in a variety of ways. For example, in some embodiments, low average velocity movement may be determined based on the maximum number of consecutive pedestrian steps taken by a user of the mobile device 100 in a given time period.

Figure 8:
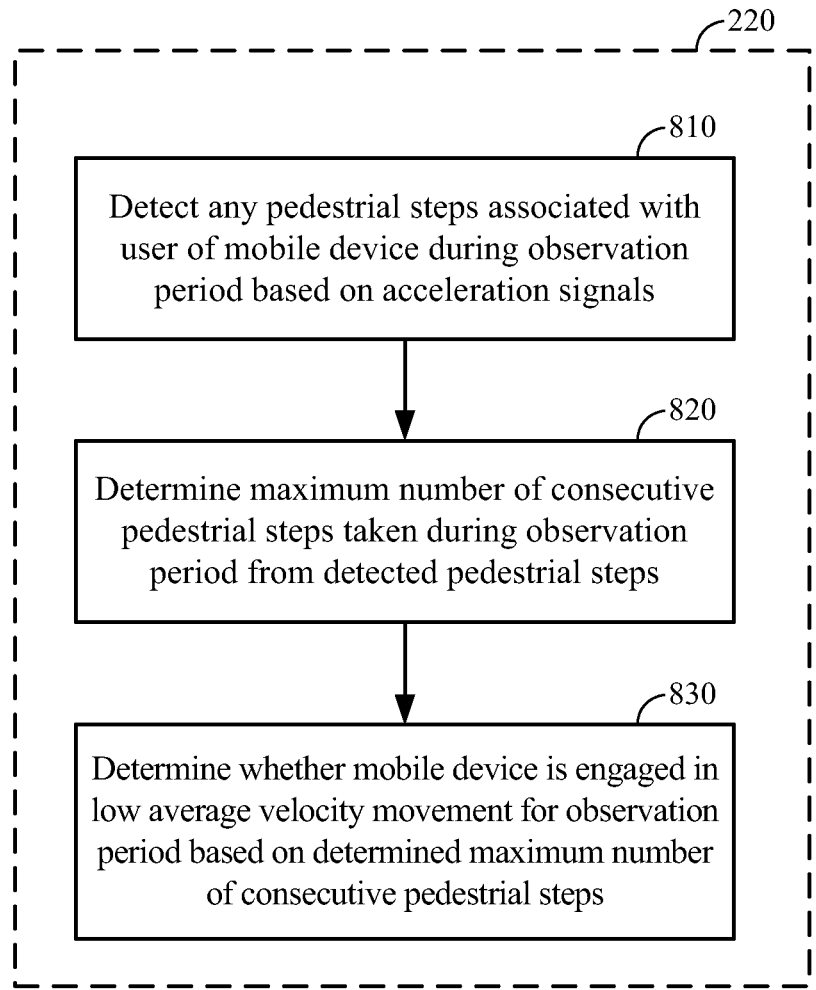
FIG. 8 illustrates an example method of determining of whether a mobile device is engaged in low average velocity movement.

FIG. 8 illustrates an example method of determining of whether the mobile device 100 is engaged in low average velocity movement as in block 220. In this example, the step detector 162 is used to detect any pedestrian steps associated with a user of the mobile device 100 during an observation period (block 810). As discussed above, the step detector 162 may operate based on acceleration signals received from the accelerometer 158. For this purpose, the observation period may be set (e.g., by a system designer or an invoking application) to a time scale associated with human motion. In some embodiments, it has been found that an observation period on the order of one or more seconds (e.g., between about two seconds and about ten seconds) provides appropriate operation. However, it will be appreciated that the particular length of the observation period is application specific, and may vary from application to application. For power conservation reasons, in some embodiments, the step detector 162 may remain dormant until initial motion is detected by the absolute stationarity detector 154 and it is activated by the motion state identification processor 150.

From the detected pedestrian steps, the motion state identification processor 150 may determine a maximum number of consecutive pedestrian steps taken during the observation period (block 820), and determine whether the mobile device 100 is engaged in low average velocity movement for the observation period based on the determined maximum number of consecutive pedestrian steps (block 830). For example, the motion state identification processor 150 may compare the determined maximum number of consecutive pedestrian steps to a minimum threshold number generally associated with sustained pedestrian motion. A relatively low number of consecutive pedestrian steps, or none at all, likely indicates that detected pedestrian steps do not correspond to actual, sustained pedestrian motion. It will be appreciated that the minimum threshold number of continuous steps is naturally dependent on the length of the observation period selected, as well as characteristics of human walking. In some designs, the minimum threshold number of continuous steps may be set roughly equivalent to the number of seconds in the observation period (e.g., for an observation period of five seconds, the minimum threshold number of continuous steps may be set to five continuous steps). For relatively short observation periods, the minimum threshold number of continuous steps may be slightly larger. It will be appreciated that the particular minimum threshold number of continuous steps that is selected will be application specific, and may vary from application to application.

Figure 9:
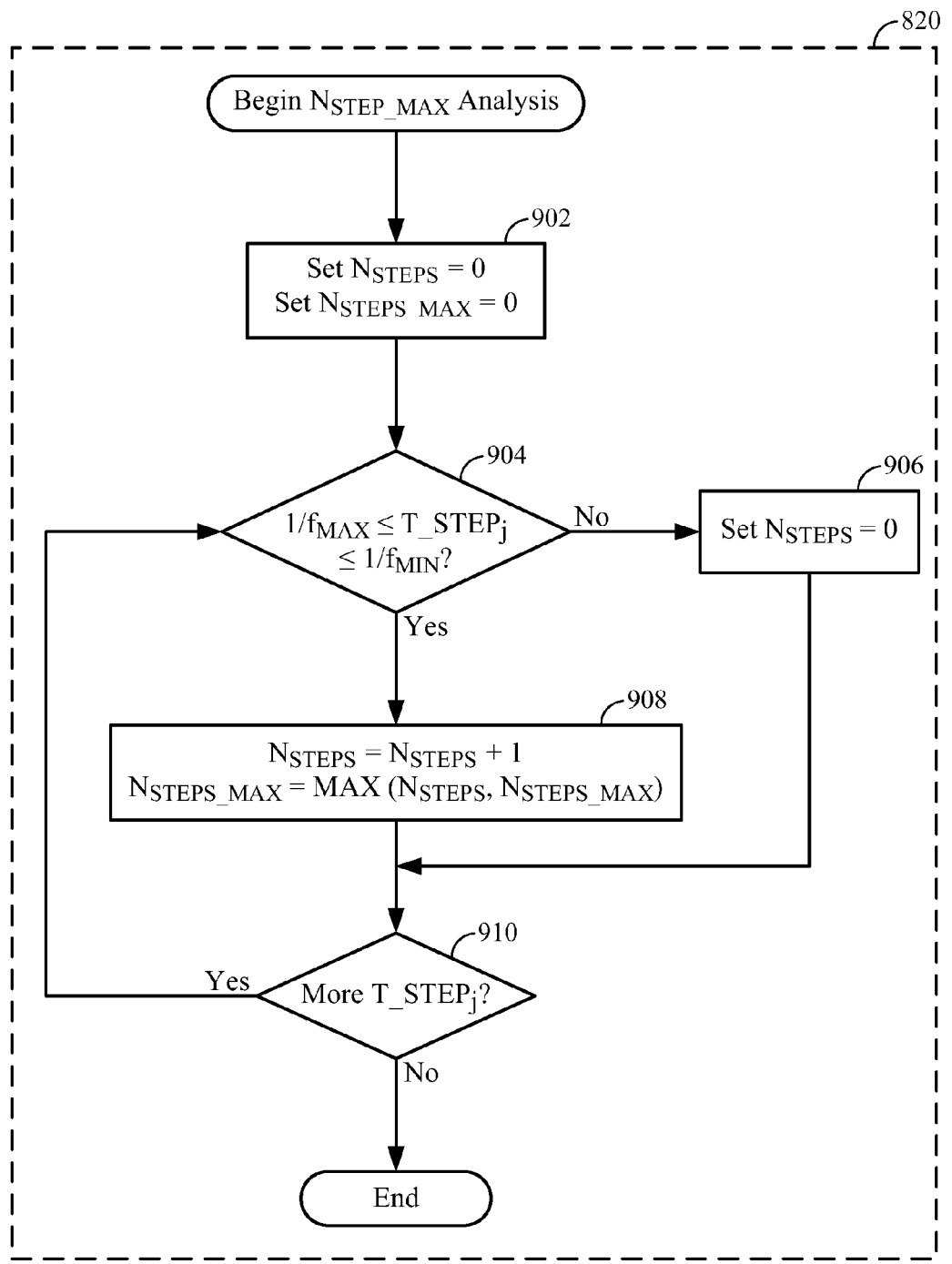
FIG. 9 illustrates an example method of determining a maximum number of consecutive pedestrian steps taken during a given observation period.

FIG. 9 illustrates an example method of determining a maximum number of consecutive pedestrian steps $N_{STEPS\_MAX}$ taken during a given observation period $T_i$ as in block 820. In this example, two counters are used, including one for a number of continuous pedestrian steps $N_{STEPS}$ and one for a maximum number of consecutive pedestrian steps $N_{STEPS\_MAX}$, and both are initially set to zero (block 902). The motion state identification processor 150 then analyzes a sequence of step time stamps provided by the step detector 162 over the observation period of interest $T_i$ by comparing the time intervals between each detected step $T\_STEP_j$ to maximum and minimum step frequency requirements $f_{MAX}$ and $f_{MIN}$ (block 904). Each $T\_STEP_j$ may be calculated as the difference between successive step time stamps, with the time stamp of the last step detected during the previous observation period $T_{i-1}$ being used to determine the step interval of the first step $T\_STEP_1$ of the current observation period $T_i$.

The maximum and minimum step frequency requirements $f_{MAX}$ and $f_{MIN}$ correspond to time intervals between steps that are indicative of actual, sustained pedestrian motion (e.g., continuous walking or running) as opposed to mere fidgeting. Experimentation by the inventor has revealed that steps associated with actual pedestrian motion occur within a range of characteristic time intervals between successive steps. For example, a person holding a cellular telephone that sits down in a chair may cause an isolated step to be detected, even though actual low average velocity movement of the type at interest has not occurred. This step may be distinguished as fidgeting by the fact that it is uncharacteristically isolated from other steps. Similarly, a person holding a cellular telephone and tapping it against their palm may cause a series of steps to be detected, even though again actual low average velocity movement of the type at interest has not occurred. This series of steps can likewise be distinguished as fidgeting by the fact that the steps occur uncharacteristically close together. Accordingly, the maximum frequency requirement $f_{MAX}$ is imposed to filter out step intervals that appear too short to represent actual low average velocity movement, while the minimum step frequency requirement $f_{MIN}$ is imposed to filter out step intervals that appear too long to represent actual low average velocity movement.

If a given step interval $T\_STEP_j$ reported during the observation period $T_i$ indicates that successive steps have occurred within the acceptable step frequency requirements $f_{MAX}$ and $f_{MIN}$, the number of consecutive pedestrian steps $N_{STEPS}$ is incremented, and the maximum number of consecutive pedestrian steps $N_{STEPS\_MAX}$ is set to either the current value of consecutive pedestrian steps $N_{STEPS}$ or the current value of the maximum number of consecutive pedestrian steps $N_{STEPS\_MAX}$, whichever is greater (block 906). Otherwise, if a given step interval $T\_STEP_j$ reported during the observation period $T_i$ indicates that the successive steps occurred outside of the acceptable step frequency requirements $f_{MAX}$ and $f_{MIN}$, the number of consecutive pedestrian steps $N_{STEPS}$ is reset to zero (block 908). In this case, the maximum number of consecutive pedestrian steps $N_{STEPS\_MAX}$ is maintained at its current value. This series of determinations and calculations is repeated for each step interval $T\_STEP_j$ in the current observation period $T_i$ (block 910).

As with the length of the observation period, the maximum and minimum step frequency requirements $f_{MAX}$ and $f_{MIN}$ may be configurable, and are typically set to a time scale associated with human motion. For example, in some embodiments the maximum and minimum step frequency requirements $f_{MAX}$ and $f_{MIN}$ may be on the order of a few steps per second (e.g., between about two and three steps per second for $f_{MAX}$, and between about one and two steps per second for $f_{MIN}$). However, it will again be appreciated that the particular values for $f_{MAX}$ and $f_{MIN}$ that are selected will be application specific, and may vary from application to application.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Further, the functionality associated with each of the illustrative logical blocks, modules, and circuits may be partially or fully subsumed by a different component, shown or not shown, in other embodiments. For example, the absolute stationarity detector 154, step detector 162, and/or RF environment analyzer 170 functionality may be integrated directly into the motion state identification processor 150 in some embodiments. Similarly, all or some of the motion state identification processor 150 functionality may be performed by the general purpose controller/processor 140 of the mobile device 100.

Each of the processors described above may be a microprocessor, but in the alternative, each processor may be any conventional processor, controller, microcontroller, or state machine. Each processor may also be implemented as a combination of computing devices, such as a combination of a DSP and a microprocessor, a plurality of microprocessors, one or more microprocessors in conjunction with a DSP core, or any other such configuration. In addition, for each of the embodiments described herein, the corresponding form of any such embodiments may be described herein as, for example, "logic configured to" perform the described action.

It will be appreciated that many of the various logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. In addition, information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In one or more example embodiments, the functions described may be implemented in hardware, software, firmware, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact discs (CDs), laser discs, optical discs, digital versatile discs (DVDs), floppy disks and blu-ray discs where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order, unless otherwise noted or required. Furthermore, although elements of the invention may be described or claimed in the singular, the plural is contemplated unless limitation to the singular is explicitly stated.

What is claimed is:

1. A method of identifying geographic stationarity of a mobile device, comprising:
   determining whether the mobile device is engaged in high average velocity movement based on a radio frequency (RF) environment variation estimation;
   determining whether the mobile device is engaged in low average velocity movement based on pedestrial stepping information; and
   declaring a stationary state for the mobile device based on the high and low average velocity movement determinations indicating an absence of high and low average velocity movement.

2. The method of claim 1, wherein the stationary state corresponds to absolute stationarity of the mobile device or fidgeting by a user of the mobile device, in which a geographic location of the mobile device remains substantially constant.

3. The method of claim 1, further comprising:
   monitoring absolute stationarity of the mobile device using an accelerometer, wherein determining whether the mobile device is engaged in high average velocity movement is not initiated until the monitoring indicates at least some motion, and wherein determining whether the mobile device is engaged in low average velocity movement is not initiated until the mobile device is determined to not be engaged in high average velocity movement.

4. The method of claim 1, further comprising:
   declaring a moving state for the mobile device when the mobile device is determined to be engaged in high or low average velocity movement.

5. The method of claim 1, further comprising:
   declaring a moving state for the mobile device when RF environment information is not available.

6. The method of claim 1, wherein the RF environment variation estimation is derived from wireless wide area network base station signaling.

7. The method of claim 6, further comprising:
   determining whether the wireless wide area network base station is geographically stationary; and prompting declaration of a moving state for the mobile device when the wireless wide area network base station is not geographically stationary.

8. The method of claim 7, wherein determining whether the wireless wide area network base station is geographically stationary comprises:
   determining a geographic location of the mobile device;
   determining that the geographic location corresponds to being at sea; and
   declaring that the wireless wide area network base station is not geographically stationary.

9. The method of claim 7, wherein determining whether the wireless wide area network base station is geographically stationary comprises:
   collecting wireless wide area network base station system and network identification information;
   determining that the wireless wide area network base station is located on a cruise ship; and
   declaring that the wireless wide area network base station is not geographically stationary.

10. The method of claim 1, wherein determining whether the mobile device is engaged in high average velocity movement comprises:
    monitoring RF signaling received by the mobile device;
    tracking a received RF signal envelope; and
    estimating a velocity of the mobile device based on squared deviations of a logarithmically compressed representation of the received RF signal envelope.

11. The method of claim 1, wherein determining whether the mobile device is engaged in high average velocity movement comprises:
    monitoring RF signaling received by the mobile device;
    tracking a received RF signal envelope; and
    estimating a velocity of the mobile device based on a level crossing rate of a logarithmically compressed representation of the received RF signal envelope.

12. The method of claim 1, wherein determining whether the mobile device is engaged in low average velocity movement comprises:
    detecting any pedestrian steps associated with a user of the mobile device during an observation period based on accelerometer signals;
    determining a maximum number of consecutive pedestrian steps taken during the observation period from the detected pedestrian steps; and
    determining whether the mobile device is engaged in low average velocity movement for the observation period based on the determined maximum number of consecutive pedestrian steps.

13. The method of claim 1, further comprising:
    disabling at least one geographical location update of the mobile device in response to declaring the stationary state.

14. The method of claim 1, wherein low average velocity movement corresponds to continuous walking or running by a user of the mobile device, and wherein high average velocity movement corresponds to automotive, aircraft, watercraft, or bicycle travel.

15. An apparatus for identifying geographic stationarity of a mobile device, comprising:
    at least one processor configured to:
        determine whether the mobile device is engaged in high average velocity movement based on a radio frequency (RF) environment variation estimation,
        determine whether the mobile device is engaged in low average velocity movement based on pedestrian stepping information, and
        declare a stationary state for the mobile device based on the high and low average velocity movement determinations indicating an absence of high and low average velocity movement; and
    memory coupled to the at least one processor and configured to store related data and instructions.

16. The apparatus of claim 15, wherein the stationary state corresponds to absolute stationarity of the mobile device or fidgeting by a user of the mobile device, in which a geographic location of the mobile device remains substantially constant.

17. The apparatus of claim 15, wherein the at least one processor is further configured to:
    monitor absolute stationarity of the mobile device using an accelerometer, wherein determining whether the mobile device is engaged in high average velocity movement is not initiated until the monitoring indicates at least some motion, and wherein determining whether the mobile device is engaged in low average velocity movement is not initiated until the mobile device is determined to not be engaged in high average velocity movement.

18. The apparatus of claim 15, wherein the at least one processor is further configured to:
    declare a moving state for the mobile device when RF environment information is not available.

19. The apparatus of claim 15, wherein the RF environment variation estimation is derived from wireless wide area network base station signaling.

20. The apparatus of claim 19, wherein the at least one processor is further configured to:
    determine whether the wireless wide area network base station is geographically stationary; and
    prompt declaration of a moving state for the mobile device when the wireless wide area network base station is not geographically stationary.

21. The apparatus of claim 15, wherein determining whether the mobile device is engaged in high average velocity movement comprises:
    monitoring RF signaling received by the mobile device;
    tracking a received RF signal envelope; and
    estimating a velocity of the mobile device based on squared deviations or a level crossing rate of a logarithmically compressed representation of the received RF signal envelope.

22. The apparatus of claim 15, wherein determining whether the mobile device is engaged in low average velocity movement comprises:
    detecting any pedestrian steps associated with a user of the mobile device during an observation period based on accelerometer signals;
    determining a maximum number of consecutive pedestrian steps taken during the observation period from the detected pedestrian steps; and
    determining whether the mobile device is engaged in low average velocity movement for the observation period based on the determined maximum number of consecutive pedestrian steps.

23. The apparatus of claim 15, wherein the at least one processor is further configured to:
    disable at least one geographical location update of the mobile device in response to declaring the stationary state.

24. The apparatus of claim 15, wherein low average velocity movement corresponds to continuous walking or running by a user of the mobile device, and wherein high average velocity movement corresponds to automotive, aircraft, watercraft, or bicycle travel.

25. An apparatus for identifying geographic stationarity of a mobile device, comprising:
- means for determining whether the mobile device is engaged in high average velocity movement based on a radio frequency (RF) environment variation estimation;
- means for determining whether the mobile device is engaged in low average velocity movement based on pedestrian stepping information; and
- means for declaring a stationary state for the mobile device based on the high and low average velocity movement determinations indicating an absence of high and low average velocity movement.

26. The apparatus of claim 25, wherein the stationary state corresponds to absolute stationarity of the mobile device or fidgeting by a user of the mobile device, in which a geographic location of the mobile device remains substantially constant.

27. The apparatus of claim 25, further comprising:
- means for monitoring absolute stationarity of the mobile device using an accelerometer, wherein the means for determining whether the mobile device is engaged in high average velocity movement is not initiated until the monitoring indicates at least some motion, and wherein the means for determining whether the mobile device is engaged in low average velocity movement is not initiated until the mobile device is determined to not be engaged in high average velocity movement.

28. The apparatus of claim 25, further comprising:
- means for declaring a moving state for the mobile device when RF environment information is not available.

29. The apparatus of claim 25, wherein the RF environment variation estimation is derived from wireless wide area network base station signaling.

30. The apparatus of claim 29, further comprising:
- means for determining whether the wireless wide area network base station is geographically stationary; and
- means for prompting declaration of a moving state for the mobile device when the wireless wide area network base station is not geographically stationary.

31. The apparatus of claim 25, wherein the means for determining whether the mobile device is engaged in high average velocity movement comprises:
- means for monitoring RF signaling received by the mobile device;
- means for tracking a received RF signal envelope; and
- means for estimating a velocity of the mobile device based on squared deviations or a level crossing rate of a logarithmically compressed representation of the received RF signal envelope.

32. The apparatus of claim 25, wherein the means for determining whether the mobile device is engaged in low average velocity movement comprises:
- means for detecting any pedestrian steps associated with a user of the mobile device during an observation period based on accelerometer signals;
- means for determining a maximum number of consecutive pedestrian steps taken during the observation period from the detected pedestrian steps; and
- means for determining whether the mobile device is engaged in low average velocity movement for the observation period based on the determined maximum number of consecutive pedestrian steps.

33. The apparatus of claim 25, further comprising:
- means for disabling at least one geographical location update of the mobile device in response to declaring the stationary state.

34. The apparatus of claim 25, wherein low average velocity movement corresponds to continuous walking or running by a user of the mobile device, and wherein high average velocity movement corresponds to automotive, aircraft, watercraft, or bicycle travel.

35. A non-transitory computer-readable medium comprising code, which, when executed by a processor, causes the processor to perform operations for identifying geographic stationarity of a mobile device, the computer-readable medium comprising:
- code for determining whether the mobile device is engaged in high average velocity movement based on a radio frequency (RF) environment variation estimation;
- code for determining whether the mobile device is engaged in low average velocity movement based on pedestrian stepping information; and
- code for declaring a stationary state for the mobile device based on the high and low average velocity movement determinations indicating an absence of high and low average velocity movement.

36. The computer-readable medium of claim 35, wherein the stationary state corresponds to absolute stationarity of the mobile device or fidgeting by a user of the mobile device, in which a geographic location of the mobile device remains substantially constant.

37. The computer-readable medium of claim 35, further comprising:
- code for monitoring absolute stationarity of the mobile device using an accelerometer, wherein the code for determining whether the mobile device is engaged in high average velocity movement is not initiated until the monitoring indicates at least some motion, and wherein the code for determining whether the mobile device is engaged in low average velocity movement is not initiated until the mobile device is determined to not be engaged in high average velocity movement.

38. The computer-readable medium of claim 35, further comprising:
- code for declaring a moving state for the mobile device when RF environment information is not available.

39. The computer-readable medium of claim 35, wherein the RF environment variation estimation is derived from wireless wide area network base station signaling.

40. The computer-readable medium of claim 39, further comprising:
- code for determining whether the wireless wide area network base station is geographically stationary; and
- code for prompting declaration of a moving state for the mobile device when the wireless wide area network base station is not geographically stationary.

41. The computer-readable medium of claim 35, wherein the code for determining whether the mobile device is engaged in high average velocity movement comprises:
- code for monitoring RF signaling received by the mobile device;
- code for tracking a received RF signal envelope; and
- code for estimating a velocity of the mobile device based on squared deviations or a level crossing rate of a logarithmically compressed representation of the received RF signal envelope.

42. The computer-readable medium of claim 35, wherein the code for determining whether the mobile device is engaged in low average velocity movement comprises:
- code for detecting any pedestrian steps associated with a user of the mobile device during an observation period based on accelerometer signals;

code for determining a maximum number of consecutive pedestrial steps taken during the observation period from the detected pedestrial steps; and code for determining whether the mobile device is engaged in low average velocity movement for the observation period based on the determined maximum number of consecutive pedestrial steps.

43. The computer-readable medium of claim 35, further comprising:

code for disabling at least one geographical location update of the mobile device in response to declaring the stationary state.

44. The computer-readable medium of claim 35, wherein low average velocity movement corresponds to continuous walking or running by a user of the mobile device, and wherein high average velocity movement corresponds to automotive, aircraft, watercraft, or bicycle travel.

* * * * *